US00H002217H

(19) United States

(12) Statutory Invention Registration (10) Reg. No.: US H2217 H

Smay et al. (43) Published: Jun. 3, 2008

(54) CONTAINER

(75) Inventors: Cathy O. Smay, Newburgh, IN (US); Robin Wiggins, Newburgh, IN (US)

(73) Assignee: Bristol-Myers Squibb Company, Princeton, NJ (US)

(21) Appl. No.: 29/206,122

(22) Filed: May 26, 2004

(51) LOC (8) Cl. ..... 09-07

(52) U.S. Cl. ..... D9/503; D9/504

(58) Field of Classification Search ..... D9/424, D9/428, 500, 502–504, 509–511, 513, 516, D9/529–530, 537, 543, 548–549, 555, 560, D9/568, 571, 575; D28/73, 76, 91; D7/543, D7/601–603, 612, 529; 215/12.2, 13.1, 381–385, 215/396, 398, 400; 220/669, 675–676

See application file for complete search history.

(56) References Cited

U.S. PATENT DOCUMENTS

| | | | | | |
|---|---|---|---|---|---|
| 1,607,865 | A | | 11/1926 | Butler | |
| 1,703,185 | A | | 2/1929 | White | |
| 1,768,771 | A | | 7/1930 | La Tourrette | |
| D86,425 | S | * | 3/1932 | Weil | D9/504 |
| 2,076,549 | A | * | 4/1937 | Conner | 215/12.1 |
| 2,738,900 | A | | 3/1956 | Wenger | 222/114 |
| 2,978,142 | A | | 4/1961 | Novick | 220/97 |
| 3,206,016 | A | * | 9/1965 | Fowle et al. | D9/504 |
| 3,244,313 | A | * | 4/1966 | Miles | 215/12.2 |
| 3,401,825 | A | | 9/1968 | Weiss | 220/60 |
| 3,955,742 | A | | 5/1976 | Marshall et al. | 229/1.5 C |
| 4,036,398 | A | | 7/1977 | Hoogvelt et al. | 220/270 |
| 4,095,716 | A | | 6/1978 | Meany | 215/100 R |
| D259,625 | S | * | 6/1981 | Hamilton et al. | D9/428 |
| D263,581 | S | * | 3/1982 | Kaye | D13/103 |
| D269,157 | S | * | 5/1983 | Scott, III | D9/500 |
| 4,432,466 | A | | 2/1984 | Allen | 220/276 |
| D278,680 | S | * | 5/1985 | Guzzini | D9/505 |
| D280,975 | S | * | 10/1985 | Van Dine | D9/504 |
| 4,685,582 | A | | 8/1987 | Pulciani et al. | 220/66 |
| D303,584 | S | * | 9/1989 | Bakic | D28/91 |
| 5,009,310 | A | | 4/1991 | Finney | 206/229 |
| 5,042,712 | A | | 8/1991 | DeRoseau | 229/1.5 C |
| 5,054,642 | A | | 10/1991 | Yoshida | 220/276 |

(Continued)

FOREIGN PATENT DOCUMENTS

WO DM/064351 * 9/2003

*Primary Examiner*—Michael J. Carone

(74) *Attorney, Agent, or Firm*—Nelson Mullins Riley & Scarborough, LLP

(57) CLAIM

The ornamental design for a container, substantially as shown and described.

DESCRIPTION

1 Claim, 3 Drawing Sheets

Figure 1:
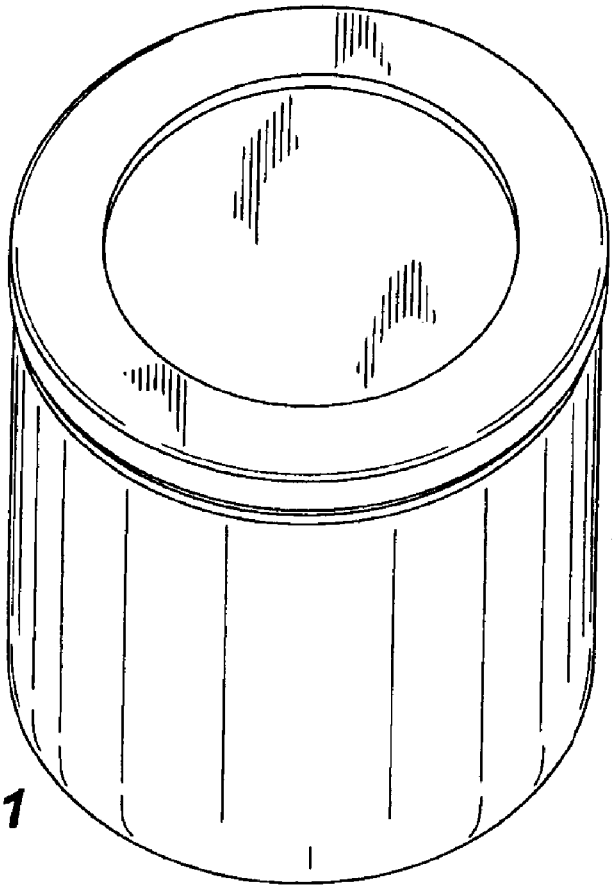
FIG. 1 is a perspective view of a container embodying the design of the present invention.
Figure 2:
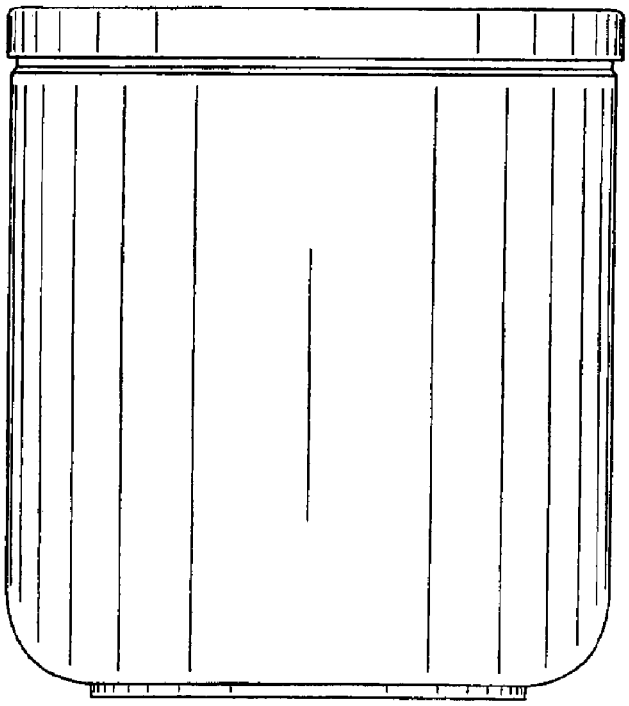
FIG. 2 is a front elevational view of the container illustrated in FIG. 1, the rear view and side views being a mirror image of the front view.
Figure 3:
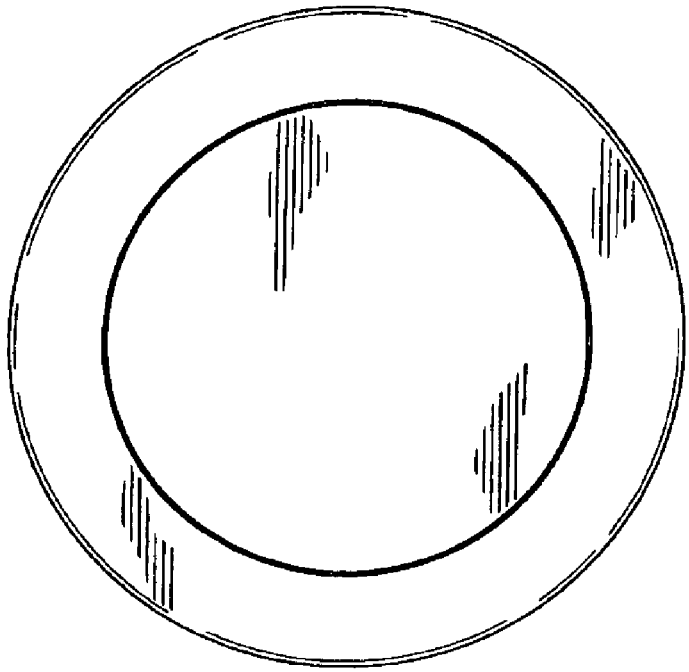
FIG. 3 is a top view of the container illustrated in FIG. 1.
Figure 4:
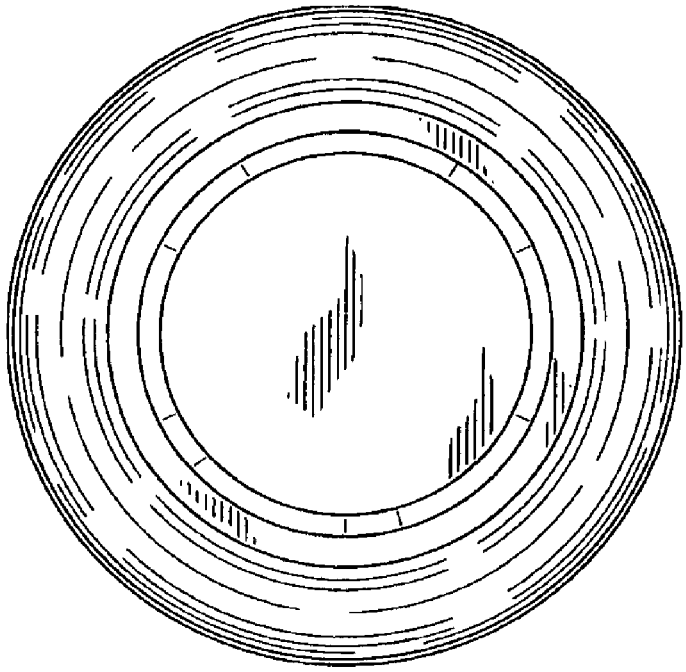
FIG. 4 is a bottom view of the container illustrated in FIG. 1.
Figure 5:
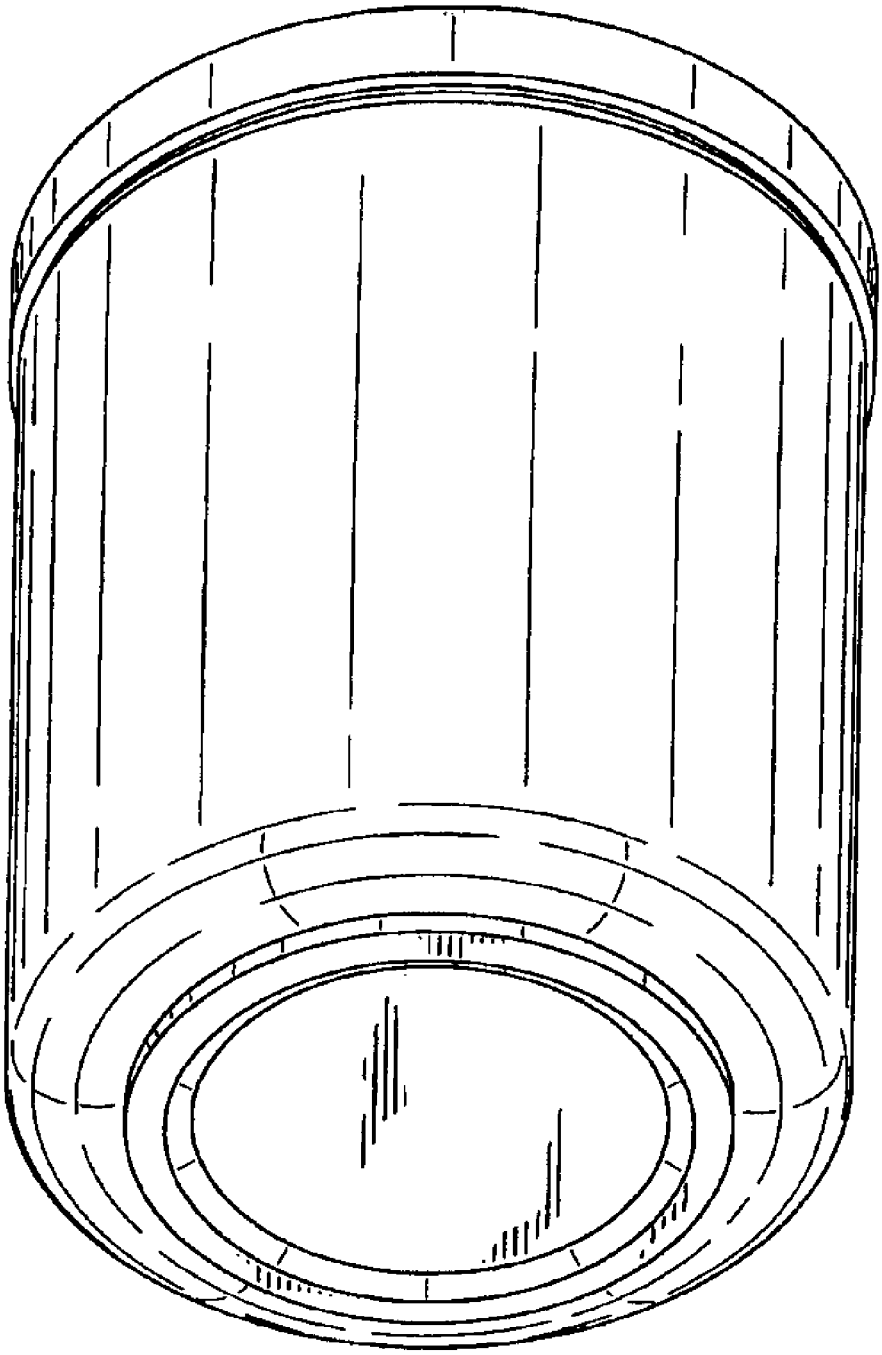
FIG. 5 is a bottom perspective view of the container illustrated in FIG. 1.

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | | | |
|---|---|---|---|---|---|
| D321,318 | S | * | 11/1991 | Gunter | D9/503 |
| D322,753 | S | * | 12/1991 | Sussman | D9/504 |
| 5,090,572 | A | | 2/1992 | DeRoseau | 206/542 |
| D333,758 | S | * | 3/1993 | Lillelund | D7/602 |
| 5,312,011 | A | | 5/1994 | Fischer | 220/528 |
| D352,210 | S | * | 11/1994 | Cousins et al. | D7/629 |
| 5,409,126 | A | | 4/1995 | DeMars | 220/4.27 |
| 5,409,128 | A | | 4/1995 | Mitchell | 220/23.4 |
| 5,415,309 | A | | 5/1995 | Wang | 220/4.27 |
| D370,300 | S | * | 5/1996 | Gottvald et al. | D7/603 |
| 5,647,413 | A | | 7/1997 | Horrell | 141/108 |
| 5,695,084 | A | | 12/1997 | Chmela et al. | 220/212 |
| 5,705,212 | A | | 1/1998 | Atkinson | 416/115 |
| 5,706,974 | A | | 1/1998 | Murdick et al. | 220/735 |
| 5,740,914 | A | | 4/1998 | Herzog | 206/501 |
| 5,775,531 | A | | 7/1998 | Lowry | 220/212.5 |
| 5,799,792 | A | | 9/1998 | Abrums | 206/508 |
| D405,609 | S | * | 2/1999 | Fu et al. | D3/302 |
| D466,814 | S | * | 12/2002 | Hurlburt | D9/504 |
| D473,345 | S | * | 4/2003 | Thorpe | D28/82 |

* cited by examiner